United States Patent [19]

Koerdt et al.

[11] 4,411,308
[45] Oct. 25, 1983

[54] VAULTED COVER ASSEMBLY TO CLOSE A VERTICAL RECESS IN A PRESSURE VESSEL

[75] Inventors: Reinhold Koerdt, Hemsbach; Hans-Georg Schwiers, Ketsch; Josef Schoening, Hambruecken, all of Fed. Rep. of Germany

[73] Assignee: Hochtemperatur-Reaktorbau GmbH, Cologne, Fed. Rep. of Germany

[21] Appl. No.: 284,796

[22] Filed: Jul. 20, 1981

[30] Foreign Application Priority Data

Jul. 19, 1980 [DE]  Fed. Rep. of Germany ....... 3027510

[51] Int. Cl.³ .................. F28F 9/00; F22B 37/20; F22B 37/24
[52] U.S. Cl. ................... 165/70; 122/510; 165/82; 165/83; 165/134 R; 165/136
[58] Field of Search ............. 165/70, 82, 83, 134 R, 165/135, 136, 162; 122/32, 508, 510, 511

[56] References Cited

U.S. PATENT DOCUMENTS

| | | | |
|---|---|---|---|
| 2,145,877 | 2/1939 | Houdry | 165/135 |
| 2,834,581 | 5/1958 | Schefels et al. | 165/136 |
| 2,872,163 | 2/1959 | Ranstead | 122/510 X |
| 3,125,160 | 3/1964 | Long | 165/135 |
| 3,768,980 | 10/1973 | Anderson | 122/510 X |
| 4,267,882 | 5/1981 | Gralton | 165/83 |
| 4,304,574 | 12/1981 | Buchner et al. | 122/510 X |

FOREIGN PATENT DOCUMENTS

3005905  9/1981  Fed. Rep. of Germany ...... 122/508

Primary Examiner—Sheldon J. Richter
Attorney, Agent, or Firm—Schwartz, Jeffery, Schwaab, Mack, Blumenthal & Koch

[57] ABSTRACT

The invention concerns a vaulted cover to close a vertical recess in a pressure vessel with a plurality of fittings welded to the cover for the passage of steam pipes and with heat insulation applied to the inside of the cover consisting of a thermally insulating material and a plurality of rectangular cover plates arranged on the thermally insulating material, wherein the cover plates are fastened to the cover by means of holding bolts penetrating the entire insulation.

21 Claims, 9 Drawing Figures

VAULTED COVER ASSEMBLY TO CLOSE A VERTICAL RECESS IN A PRESSURE VESSEL

BACKGROUND OF THE INVENTION

1. Field of the Invention

The invention concerns a vaulted cover to close a vertical recess in a pressure vessel with a plurality of fittings welded to the cover for the passage of steam pipes and with heat insulation applied to the inside of the cover, consisting of a thermally insulating material and a plurality of rectangular cover plates arranged on the thermally insulating material wherein the cover plates are fastened to the cover by means of holding bolts penetrating the entire insulation.

2. Background of the Prior Art

Covers of this type are used for example to cover components of nuclear power stations, such as steam generators or coolers, wherein high temperatures are prevailing. The covers are, therefore, provided with heat insulation. The layout of such an insulation represents a difficult technical problem, as the covers have numerous passages for steam pipes disrupting the insulation in these locations. Furthermore, the large differential thermal expansion of such a vaulted cover and the metallic covering of its heat insulation must be considered. In order to avoid the exposure of the holding bolts to excessive bending stresses, the covering must be subdivided into a plurality of plates.

The state-of-the-art shows thermally insulating devices on walls exposed to a gaseous heat carrier. Thus, from West German Offenlegungsschrift No. 21 59 781, heat insulation for the pressure vessel of a reactor is known, comprising several layers of a highly porous metal mesh and thin metal sheets located between said layers. The insulation is covered with holder sheets fastened by means of bolts to the liner of the pressure vessel. A number of gaps between the individual plates of the insulating material resulting from manufacturing tolerances, connect the layers of mesh under pressure with the heat carrier.

In West German Offenlegungsschrift No. 29 14 040, another thermally insulating device applied to surfaces of a nuclear reactor is described, consisting of several layers of a metal fabric or metal screens, separated by intermediate sheets of metal and assembled into panels. The tables, covered on their circumference with sheathing, abut on one side against the surface to be protected and are covered on the other side by a supporting sheet. The panels and the supporting sheets on the surface to be protected are secured by means of hollow bolts with nuts screwed onto the "hot" end of said bolts.

It has also been proposed to provide the fastening bolts of such thermal insulations with spacer sleeves, resting with one end on the surface to be protected and with the other fixedly supporting the holding sheets or cover plates. Supports are arranged so that the thermal expansion of the cover plates is not hindered.

SUMMARY OF THE INVENTION

It is an object of the present invention to design and fasten the thermal insulation in the case of a vaulted cover of the above-described type so that in spite of differential thermal expansions of the cover and the covering plates, it is able to absorb additional stresses, for example, as the result of malfunctions or rapid changes in pressure.

Rapid pressure changes occur, for example, upon the opening of safety valves. In order to exclude in such cases the possibility of a destruction of the heat insulation, provisions must be made for the equalization of pressure. An example of a failure potentially leading to damage to the insulation is the rupture of one of the steam pipes passing through the vaulted cover. As a result of such a failure, the cover is exposed to thermal stresses far exceeding the load imposed at the operating temperature. The insulation is required not only to withstand this increased temperature exposure but also the mechanical stressing by the exiting steam jet without damage, so that it will be able to perform its function without repairs during the subsequent operation of the components.

According to the invention, the object is attained by that a supporting frame is set on a flange located within the recess at the height of the cover, the frame consisting of at least one cylindrical section surrounding all of the steam pipes and a horizontal plate cover; the cylindrical section on top, with openings for the steam pipes, that the steam pipes are surrounded each in the zone defined by the horizontal plate and the vaulted cover by a protective tube while forming an angular gap, wherein the protective tubes are at least drawn into the fittings and, on the other, passed through the horizontal plate and that the annular gaps between the steam pipes and their protective tubes are connected with their lower ends with the space below the horizontal plate of the supporting frame, and that part of the holding bolts for the cover plates are provided in the form of corner bolts at the common corner of four cover plates, the cover plates being mounted displaceably between two sliding disks set on the corner bolts.

By means of the combination of the above-described characteristics, the cover according to the invention is assured that its thermal insulation will satisfy the requirements posed. No replacement of the insulation after malfunctions or changes in pressure is necessary.

The space between the fittings and the supporting frame is bridged by the protective tubes arranged coaxially with respect to the steam pipes. If a pipe ruptures under the horizontal plate of the supporting frame, the heat insulation is protected by the horizontal plate and the cylindrical section of the supporting frame against the direct impact of the jet of steam. In the zone defined by the cover and the horizontal plate, the protective tubes take over the protection of the insulation. Should a steam pipe burst above the protective tubes, i.e., above the cover, the emerging steam will be conducted through the annular gaps between the steam pipes and the protective tubes into the space underneath the horizontal plate.

The protective tube and the supporting frame thus prevent the contact between the steam jet and the surface of the insulation. The insulation is, thereby, protected mechanically. The thermal stressing of the insulation, as the result of the differential thermal expansion of the cover and the cover plates of the insulation, is maintained within permissible limits in the cover according to the invention by the specific mode of fastening the cover plates to the cover. The segment shaped cover plates are held in their center by a so-called locating bolt, representing a stationary point. The abutting corners of four cover plates, on the other hand, are designed as "sliding" mobile points, where the cover plates may expand without restriction. The differential expansion of the cover and the cover plates thus do not result in unadmissible cyclic bending stresses in the holding bolts and the holding bolts are, therefore, capable of absorbing the resultant force of the compression of the heat insulation, the pressure rise through the bypass of the annular gaps and the compressive force of transient pressures.

The rapid changes in pressure occuring, for example, during the opening of safety valves may be equalized by means of the gaps existing between the individual cover plates. The gaps acting as pressure relief orifices are dimensioned so that, on the one hand thermal expansion does not lead to constraints and, on the other, the heat insulating material cannot spill out.

Ceramic fiber wool is used as the heat insulating material in view of the large number of steam pipes and protective tubes penetrating the insulation. When the invention is applied to a nuclear reactor installation, reactor quality fiber wool is chosen. A fiber wool of this grade releases negligible amounts of aggressive substances, such as chlorine, when exposed to humidity and an adequate elastic rebound of the fibers is preserved.

A vaulted cover designed according to the invention may be manufactured relatively simply and, thus economically. It has the further advantage from the standpoint of installation that the heat insulation has no negative effect on the installation of the cover, i.e., the cover may be insulated independently of its final installation.

The supporting frame may also consist of several cylindrical sections placed upon each other and of the same number of horizontal plates with orifices for the steam pipes, wherein each of the cylindrical sections is covered on top by a horizontal plate. In this manner, different zones are established in the space under the vaulted cover, wherein the insulation is protected by the supporting frame against jets of steam. The number of cylindrical sections chosen depends, among other factors, on the distance of the vaulted cover from the flange upon which the supporting frame is resting. Even in the case of a supporting frame consisting of a plurality of sections, it is necessary only to extend the protective tubes for the steam pipes through the uppermost horizontal plate.

The protective tubes may be secured in different ways. Thus, each protective tube may be fastened by means of a fork-like piece over the corresponding fitting to the steam pipe involved. In case of the rupture of the steam pipe, in the area between the forked pieces and the (uppermost) horizontal plate of the supporting frame, the emerging steam jet is conducted through the annular gap around the steam pipes into the spaces above the horizontal plate. No special sealing measures are, therefore, required in the heat insulation, as no bypasses can develop outside the protective tubes. In the course of the mounting of the cover, the insertion of the protective tubes in the support frame may be effected through relatively large orifices, which significantly facilitates the process. The installation of the insulation may be effected without special provisions, wherein the heat insulating material may be secured in abutment against the protective tubes without difficulty.

If compensators are provided for the joining of the steam pipes with the fittings, the protective tubes are advantageously drawn up high enough so that they surround the steam pipes even in the area of the compensators. The protective tubes then additionally protect the compensators also.

It may be appropriate to coat the protective tubes and provide them with a mirror surface. In this manner, they are performing an additional function during normal operations, i.e., the reduction of thermal radiation, besides their protective function in case of pipe ruptures.

As an alternative means of the suspension of the protective tubes with forked pieces from the steam pipes, the protective tubes may also be secured to the support frame. For reasons of installation technology in this case, each protective tube is fastened with the aid of a double flange designed as a sliding seat to the (uppermost) horizontal plate.

This type of fastening has the advantage that the protective tube may be used simultaneously to guide the steam pipes in the cover area and in the fittings. For this purpose, the protective tubes have at their upper and lower ends, inside, an annular support surface for the steam pipes, and with the aid of these supporting surfaces, the steam pipes are forced into their required position.

Conveniently, the support surfaces in the protective tubes and the contact locations on the steam pipes are equipped with a special coating against frictional welding.

Underneath the upper annular support surface, each protective tube may have a sliding seat, whereby it rests against the inner wall of the fitting. The sliding seat serves to guide the protective tube and simultaneously divides the annular space beween the fitting and the protective tube into two chambers sealed against each other.

Between the sliding seat and the upper annular support surface for the steam pipe, advantageously a plurality of radial passage bores is provided in each protective tube. These bores serve as relief bores in the case wherein a steam pipe bursts in the protective tube. The steam may then penetrate through the relief bores into the annular gap between the steam pipe and the protective tube is conducted into the space below the (uppermost) plate of the support frame. At their ends protruding into this space in each protective tube, further relief bores are provided. These are arranged above the lower annular support surface.

To retain the heat insulating material in the area of the passages through the insulation carrying the protective tubes through, each of these passages may be lined with a sleeve.

The positioning of the sleeves is effected conveniently by means of strips of foil arranged between the cover and the heat insulating material, the strips connecting the passages with each other in the manner of a grid. Following the centering of the sleeves by means of "assembly plugs" in the passages, they are joined by welding with the strips.

In the annular space formed by a protective tube and a sleeve, a seal may be advantageously arranged to seal the space against the annular gap between the protective tube and its passage orifice in the cover. This seal serves to prevent, in the case of a pipe rupture above the protective tubes, the buildup of pressure under the insulation by means of a bypass forced open between the sliding seat of the protective tube and the fitting, thereby destroying the insulation.

The seals may consist of two thin metal strips each, for example of a thickness of 0.1 mm cut on one longitudinal side in a tooth-like manner and bent into a ring. These rings are welded to the inside of each sleeve and they are pressured during the assembly operation in a slightly bent state with the toothed side against the cover. The overlapping "teeth" have a good sealing effect.

According to an advantageous further development of the invention, the holding bolts for the cover plates are screwed with one of their ends into a threaded sleeve welded on the inside to the cover and joined by welding with the threaded sleeve. A nut is screwed onto the other end, protruding through the cover plate of the insulation of the holding bolts. It is again additionally joined by welding to the bolt. Following the welding of the threaded sleeves to the cover, the latter must be subjected to a stress relief anneal. The attachment of the threaded sleeve to the cover has the advantage that repairs or modifications may be effected at a later date on the bolts without requiring another stress releif heat treatment of the cover.

It is appropriate to join the nut of each holding bolt, possibly with the interposition of a washer, fixedly with the corresponding cover plate or, in the case of corner bolts, with one of the two slide disks supporting the cover plates. The joint may be effected by welding. The welding of the holding bolt into the threaded sleeve and its joining by welding with the nut, together with the fixed connection between the nut and the cover plate or slide disk, secures the bolt against rotation.

The slide disk to hold the cover plates and the surface of the cover plates within the slide disks may be provided advantageously with a coating against friction welding.

BRIEF DESCRIPTION OF THE DRAWINGS

In the drawing, two embodiments of the cover according to the invention are represented schematically. The cover serves to close a vertical recess in a pressure vessel upon which the cover is held, for example, by means of threaded bolts and nuts. In the drawing.

DETAILED DESCRIPTION OF THE PREFERRED EMBODIMENTS

Figure 1:
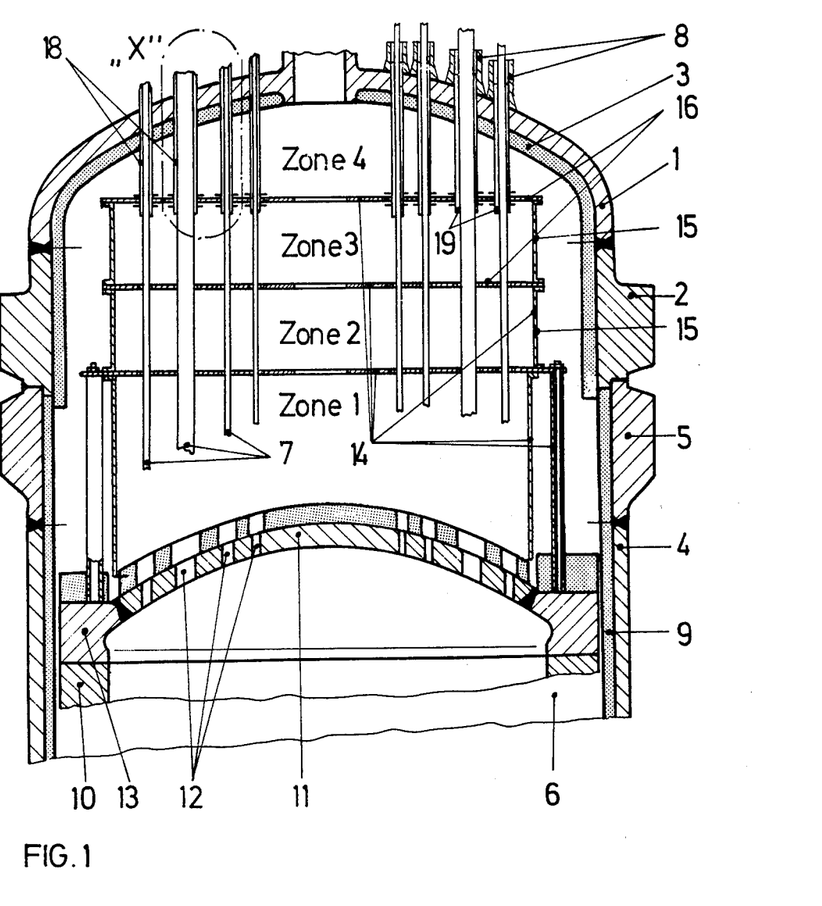
FIG. 1 shows a longitudinal section through the first example of embodiment with the support frame installed without the fastening means for the insulation.

FIG. 1 shows a vaulted cover 1 with a flange 2 and the thermal insulation 3 applied inside to the cover and the flange. The flange 2 is placed on the flange 5 of a metal lining of the recess 6, to be closed off by the cover. A plurality of steam pipes 7 is passed to the outside from the recess 6, the steam pipes penetrating through the cover 1, and its insulation is within this area being held in fitting 8 welded to the cover 1 (only a few of the fittings 8 are shown in FIG. 1).

Within the metal lining 4, also equipped with internal thermal insulation 9, there is a metal cylinder 10 closed with a cover 11, wherein a steam generator (not shown) is arranged. The cover 11 has passages 12 for the steam pipes 7 and a flange 13 as a support on the cylinder 10.

A support frame 14 consisting of several cylindrical sections 15 and horizontal plates 16, is placed upon the flange 13, the frame 14 dividing the space under the cover 1 into different zones (Zone 1, Zone 2, Zone 3, Zone 4).

Figure 6:
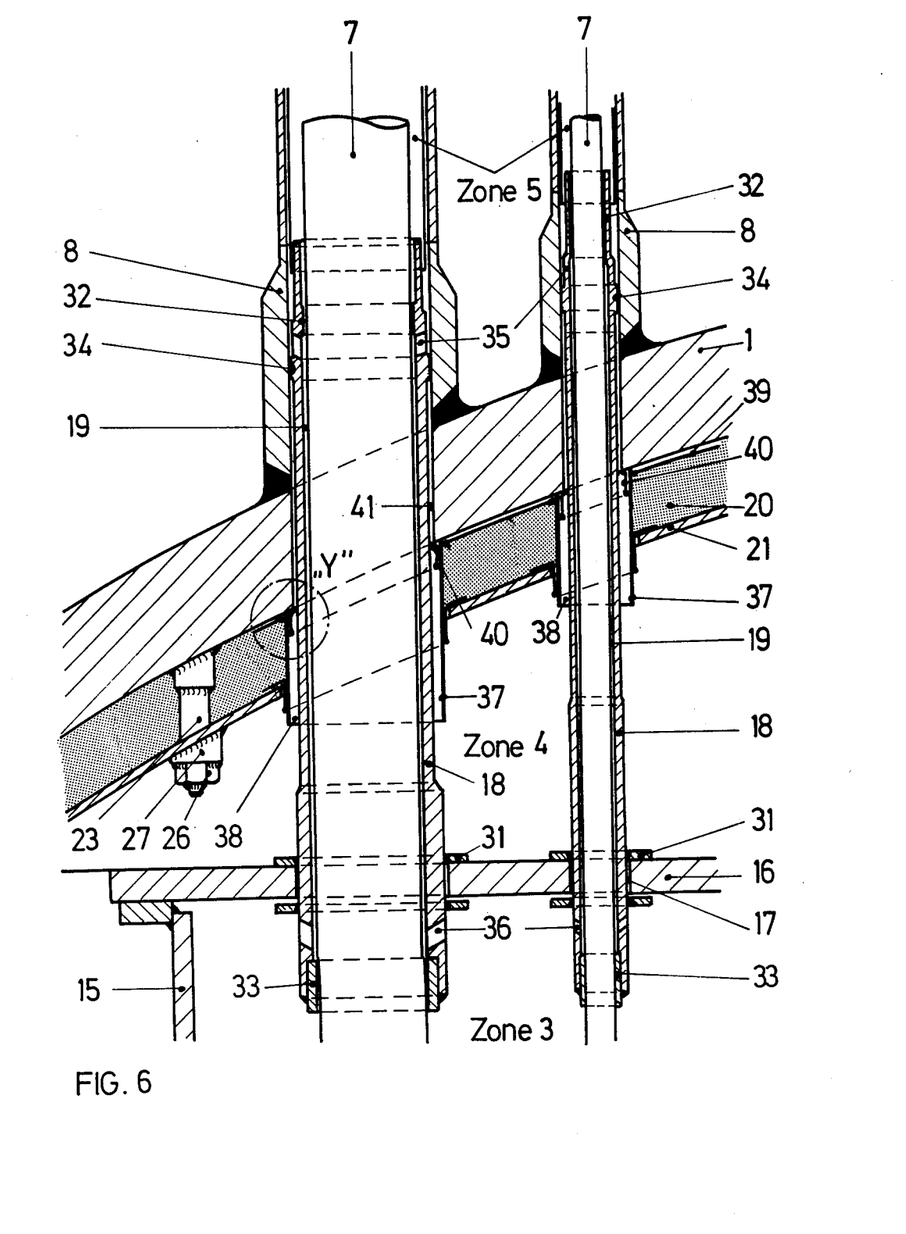
FIG. 6 represents the section of FIG. 1 designated by "X" at a larger scale.
Figure 9:
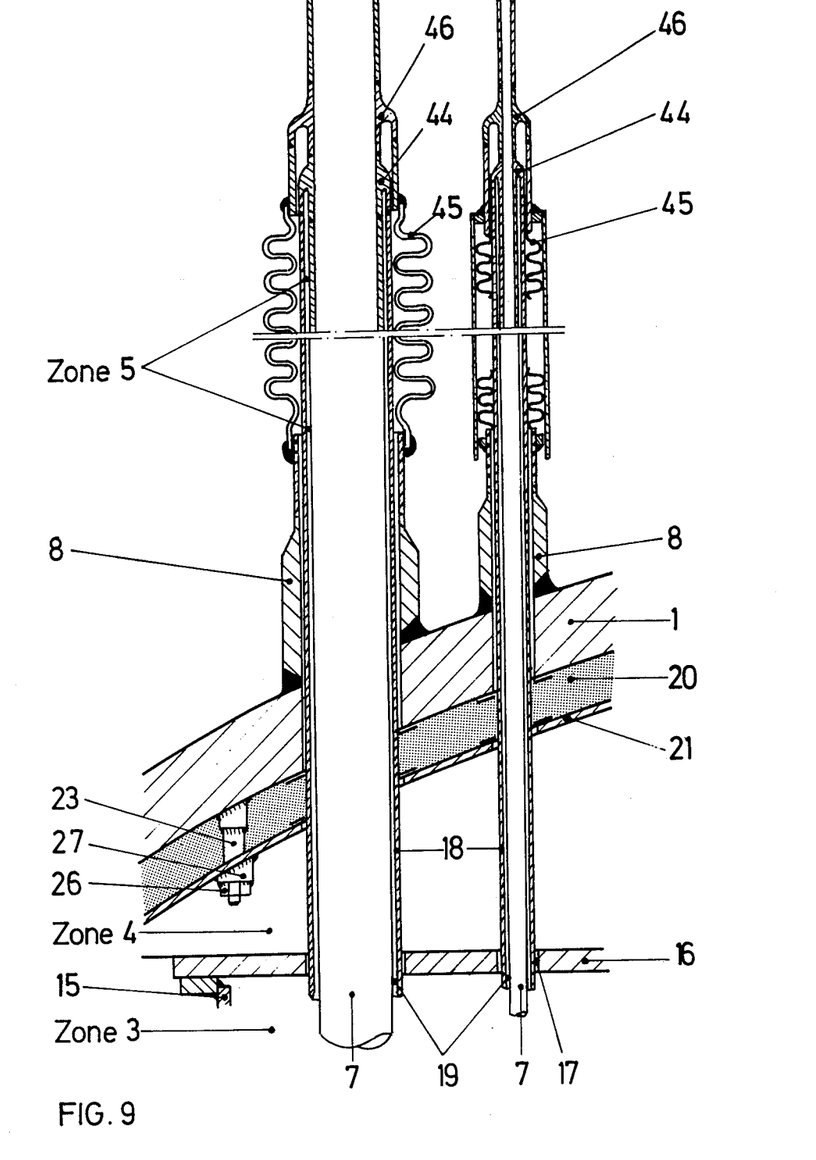
FIG. 9 shows a longitudinal section through a second example of embodiment of the cover according to the invention, but exhibiting a section only.

In Zones 1, 2 and 3, all of the steam pipes 7 are surrounded by the cylindrical sections 15, each of the latter being covered on top by one of the horizontal plates 16. The horizontal plates 16 are equpped with orifices 17 for the steam pipes 7 (FIGS. 6 and 9).

In Zone 4, i.e., the compartment defined by the cover 1 and the uppermost plate 16, each of the steam pipes 7 is surrounded by a protective tube 18, whereby annular gaps 19 are formed between the two tubes. The protective tubes 18 protrude on one side into Zone 3, i.e. they are extended through the uppermost plate 16 and the annular gap 19 is communicating with the Zone 3. On the other side, the protective tubes 18 are drawn into the fittings 8. Steam jets entering this area of the annular gaps 19 designated Zone 5 is being passed into Zone 3 through said annular gap.

Details of the thermal insulation 3 are explained in FIGS. 2 to 5. For the sake of clarity, the support frame 14 with the protective tubes 18 and the steam pipes 7 are eliminated. The insulation 3 includes the heat insulating material 20 consisting of ceramic fiber wool and a metal covering assembled of a plurality of rectangular cover plates 21. It is pressure-resistant and protects the insulating material 6 against mechanical stresses. Between the individual cover plates 21, joints 22 are provided serving firstly, as pressure relief clearances in the case of rapid changes in the pressure, for example, when a safety valve opens and, secondly, permitting the free thermal expansion of the cover plates 21.

Figure 2:
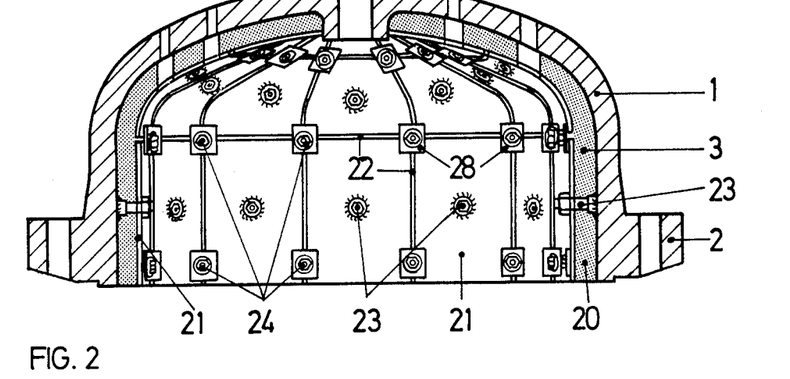
FIG. 2 illustrates a longitudinal section through the same example of embodiment without supporting frame and steam pipes, but with the fastening means for the insulation.
Figure 3:
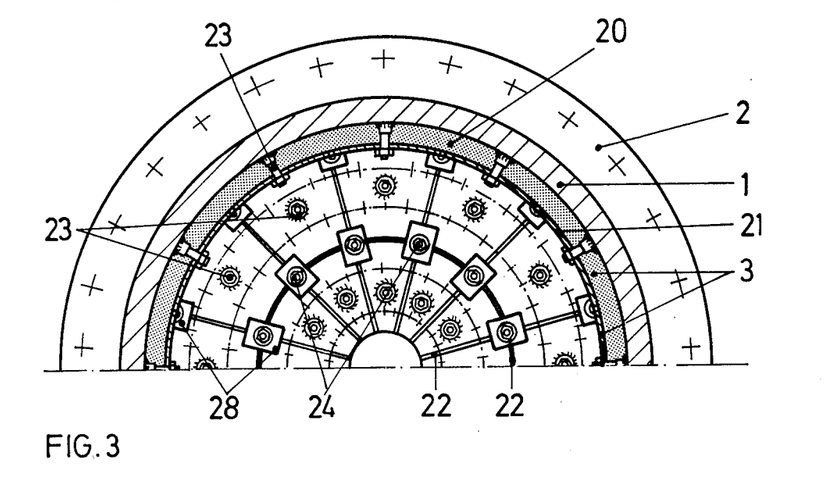
FIG. 3 depicts a top view of the inside of the cover according to FIG. 2.

The cover plates 21 are fastened by means of stationary bolts 23 and corner bolts 24 to the cover 1, wherein the stationary bolts 23 (representing fixed points) are arranged in the centers of the cover plates 21 and the corner bolts 24 occupy positions wherein the four corners of four cover plates 21 are abutting against each other. With the aid of the cover plates 21 and the bolts 23, 24 which are passing through the entire insulation 3, prestressing is produced in the heat insulation 20.

Figure 4:
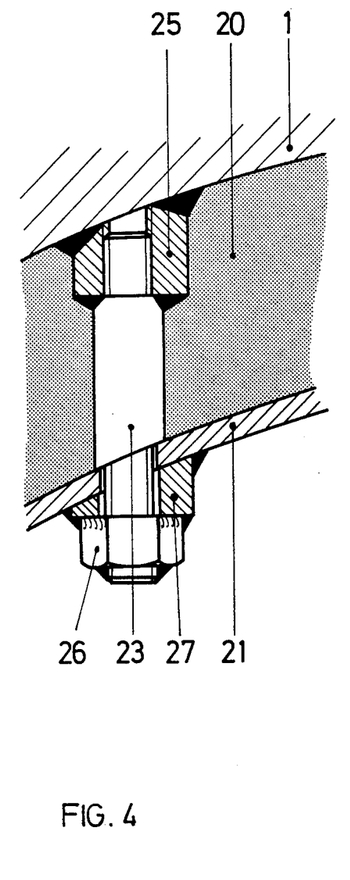
FIG. 4 shows a longitudinal section through a segment of the cover with a stationary bolt.
Figure 5:
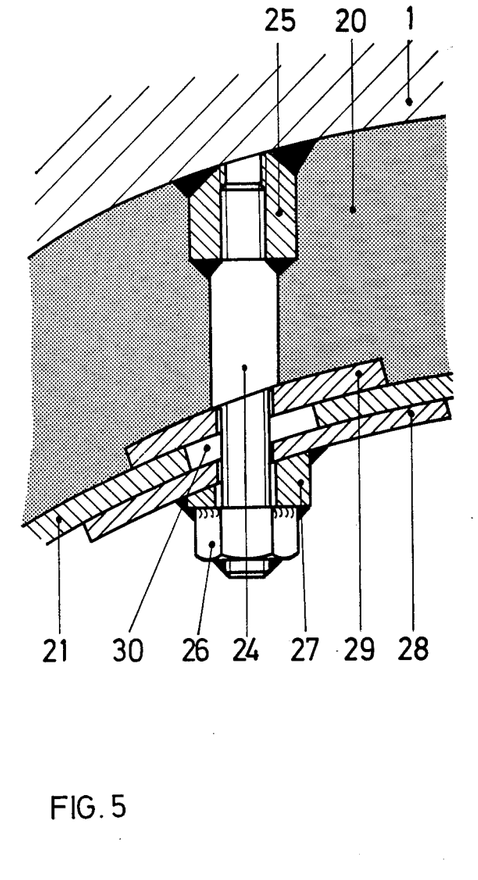
FIG. 5 illustrates a longitudinal section through a segment of the cover with a corner bolt.

As seen in FIGS. 4 and 5, the bolts 23 and 24 are provided on both ends with threading. One end of each bolt 23, 24 is threaded into a threaded sleeve 25 and secured by welding therein. The sleeve 25 is in turn welded to the inside of the cover 1. The insertion of the threaded sleeves 25 between the cover and the bolts makes subsequent modifications of the bolt possible, without the need for stress relieving the cover. A nut 26 is screwed onto the other end of each of the bolts 23, 24 which is additionally welded to the corresponding bolt. A washer 27 provided for each nut 26 is also welded to the nut.

All of the washers 27 placed on the stationary bolts 23 (FIG. 4) are welded to the corresponding cover plate 21. A rotation of the bolts 23 is thus not possible.

Two rectangular slide disks 28, 29 are pushed onto each of the corner bolts 24 (FIG. 5) with a gap 30 being left between said disks 28, 29. The abutting corners of four cover plates 21 are slidingly supported in said gap so that differential thermal expansions of the cover plates 21 and of the vaulted cover 1 cannot have harmful effects. The slide disks 28, 29 and the surface parts of the cover plates 21 located within the slide disks are provided with a coating against friction welding.

The corner bolts 24 are secured against rotation by that the washers 27 are welded to the upper slide disks 28.

FIG. 6 shows an enlarged section of FIG. 1 with two steam pipes surrounded by a protective tube 18. The protective tubes 18 are fastened by means of double flanges 31 in the uppermost horizontal plate 16 of the support frame 14. The double flanges 31 are designed as sliding seats so that the differential thermal expansions of the plate 16 and the protective tubes 18 may be equalized. At their upper and lower ends, the protective tubes 18 are equipped inside with an annular shoulder surface 32, 33 for the guidance of the steam pipes 7. Both the steam pipes 7 and the protective tubes 18 are coated against friction welding at contact locations.

Under the upper shoulder surface 32, each protective tube 18 has a sliding seat 34, whereby it is guided in its fitting 8. Between this sliding seat and the annular shoulder 32, a plurality of radial passages 35 is provided in each protective tube 18 and another series of radial passage bores 36 is found at the lower end of each protective tube 18 above the shoulder surface 33, but within the area under the horizontal plate 16. In case of a rupture of a steam pipe 7 above the slide seat 34, i.e., in Zone 5, the emerging steam jet may enter the annular gap 19 through the bores 35 and is then passed through the gap and the bores 36 into Zone 3. It is thus being kept away from the heat insulation 20.

The passages present in the heat insulation 20 for the protective tubes 18 are set into sleeves 37 to prevent the unravelling of the heat insulating material 20. In this manner, annular spaces 38 are formed between the protective tubes and the sleeves. The sleeves 37 are positioned by means of foil strips 39 arranged between the cover 1 and the heat insulation 20 and connecting the passages in the manner of a grid. The strips 39 are welded on the outside to the sleeves 37.

Figure 7:
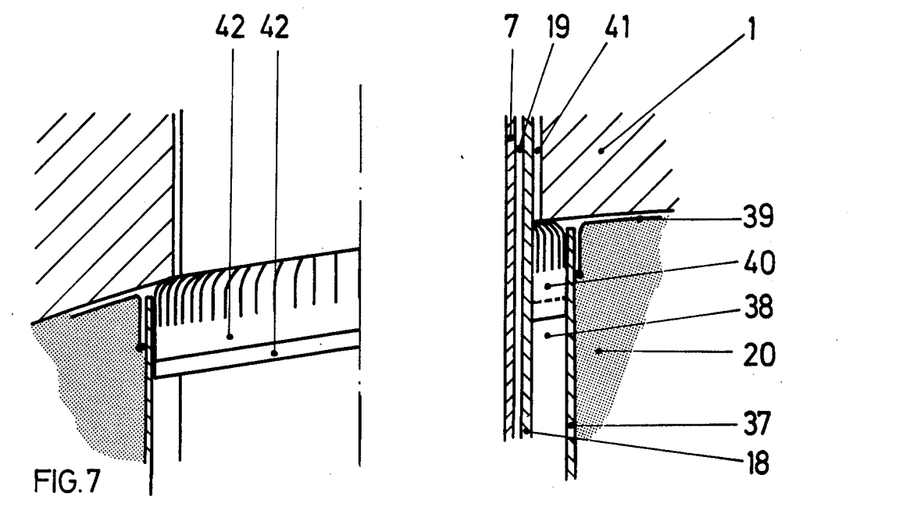
FIG. 7 represents the section of FIG. 6 designated by "Y", again enlarged.

In order to prevent, in the case of the rupturing of a pipe in Zone 5, the forcing of a small bypass of the steam at one of the slide seats 34 and the penetration of the steam into the heat insulation 20 through one of the annular gaps 41 surrounding the protective tubes 18 in the area of the cover 1, seals 40 are provided in the annular gaps 38. They are arranged and equipped to completely seal the annular gap 41. Each of the seals 40 consist of two thin metal strips 42 bent into a ring and welded to the inside of each sleeve 37, as shown in FIG. 7. The metal strips 42 are approximately 0.1 mm thick.

Figure 8:
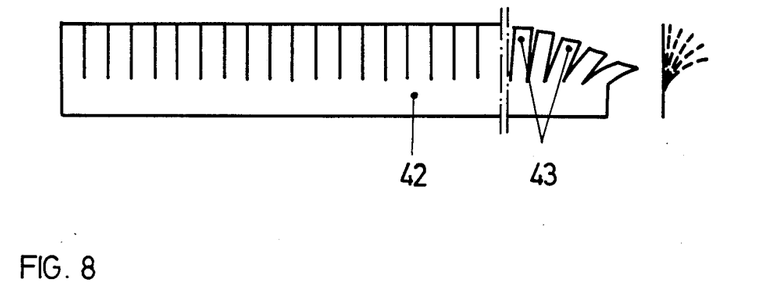
FIG. 8 illustrates the development of a detail shown in FIG. 7.

FIG. 8, showing one of the metal strips 42 rolled out, indicates that one of the longitudinal sides of the strip is cut so that a kind of teeth 43 are formed. These teeth, which after the assembly is complete, are overlapping in a slightly bent state, effect a satisfactory sealing of each annular gap 41.

FIG. 9 shows a section of a second example of embodiment of the cover according to the invention. Herein, identical symbols are used for details that are common for both examples of embodiment. The difference with respect to the first example of embodiment is in the fastening of the protective tubes 18, as described hereinbelow. The protective tubes 18 here not only absorb load in case of the rupture of a steam pipe, but they also reduce the radiation of heat during normal operations by virtue of their mirror surface.

The protective tubes 18 are secured by means of a fork element 44 to their respective steam pipe 7. The points of attachment are above the fittings 8. Each fitting 8 is connected with its steam pipe by means of a compensator 45, fastened with a fork element 46 to the steam pipe 7. The protective tubes 18 are extended upward so that the steam pipes 7 are surrounded by them over the entire area of the compensators. In this manner, the compensators 45 are also protected against the effects of a pipe rupture in Zone 5. The steam emerging during such a rupture is passed through the annular gap 19 into the Zone 3.

No special sealing measures are required on the insulation 3 in this example of embodiment because in case of the failure of a pipe no bypasses may develop in Zone 5. The protective tubes 18 may, therefore, be inserted through relatively large orifices 17 in the horizontal plates 16 of the support frame 14, thereby greatly facilitating their assembly. The heat insulation 20 is installed against the protective tubes 18 without sleeves or seals.

The specification and drawings set forth the preferred embodiments of the invention. It should be noted, however, that the invention is not limited to those specific embodiments and methods specifically disclosed, but extends to all embodiments, substitute and equivalent constructions falling within the scope of the invention as defined by the claims.

What is claimed is:

1. Vaulted cover assembly to close a vertical recess in a pressure vessel comprising a plurality of fittings welded to a cover member for the passage of steam pipes and having thermal insulation applied on the inside of the cover member, a support frame placed on a flange located within the recess in the vicinity of the cover member, said support frame consisting of at least one cylindrical section surrounding all of the steam pipes, and a horizontal plate covering the cylindrical section on top and having orifices for the steam pipes, each of said steam pipes being surrounded by a protective tube in the zone defined by said horizontal plate and said cover member, and forming an annular gap wherein said protective tubes are drawn on one side at least into the fittings and guided on the other side through the horizontal plate wherein said annular gaps between the steam pipes and the protective tubes are communicating at their lower ends with the space underneath the horizontal plate of the support frame.

2. The vaulted cover assembly of claim 1, wherein said insulation consists of a heat insulating material and of rectangular cover plates arranged on said insulating material, wherein the cover plates are fastened to the cover member by means of holding bolts penetrating through the entire insulation.

3. The vaulted cover assembly of claim 2 wherein a part of the holding bolts for the cover plates are provided in the form of corner bolts at the common location of the corners of four cover plates, which are slidingly supported between two slide disks placed on the corner bolts.

4. The vaulted cover assembly of claim 3 wherein said support frame has several cylindrical sections placed upon each other and the same number of horizontal plates with orifices for the steam pipes with each of the plates covering one of the cylindrical sections on top and dividing the space under the cover member into different zones.

5. The vaulted cover assembly of claim 4 wherein said protective pipes for the steam pipes are extended only through the uppermost horizontal plate of the support frame.

6. The vaulted cover assembly of claim 5 wherein each protective tube is fastened above the fitting by means of a fork element to the corresponding steam pipe.

7. The vaulted cover assembly of claim 6 wherein compensators are present as the connection between the steam pipes and the fittings and the respective protective tube surrounds the steam pipe in the area of the compensator.

8. The vaulted cover assembly of claim 7 wherein the protective tubes are coated and provided with a mirror surface.

9. The vaulted cover assembly of claim 8 wherein each protective tube is fastened by means of a double flange in the form of a sliding seat to the plate of the support frame.

10. The vaulted cover assembly of claim 9 wherein the protective tubes have at their upper and lower ends, on the inside, annular support surfaces for the steam pipes.

11. The vaulted cover assembly of claim 10 wherein the support surfaces of the protective tubes and the contact locations of the steam pipes are coated against the seizing of the pipes.

12. The vaulted cover assembly of claim 11 wherein each protective tube has a sliding seat under the upper annular support surface, whereby it rests against the inner wall of the respective fitting.

13. The vaulted cover assembly of claim 12 wherein each protective tube has a plurality of radial passage bores between the upper annular support surface and the sliding seat.

14. The vaulted cover assembly of claim 13 wherein the passages in the heat insulation are lined with a sleeve for the passage of the protective tubes.

15. The vaulted cover assembly of claim 14 wherein the sleeves are positioned by means of foil strips arranged between the cover and the heat insulation, said strips connecting the passages in the manner of a grid.

16. The vaulted cover assembly of claim 15 wherein a seal is arranged in each of the annular gaps formed by a protective tube and a sleeve, said seal serving to seal the annular gap between the protective tube and its passage in the cover member.

17. The vaulted cover assembly of claim 16 wherein the seals are formed by two thin metal strips and are cut tooth-like on one of their longitudinal sides, bent into a ring and welded to the inside of the respective sleeve.

18. The vaulted cover assembly of claim 17 wherein the holding bolts for the cover plates are welded by one of their ends into a threaded sleeve welded to the inside of the cover member and that a nut is screwed onto the other end of each bolt, said nut being additionally joined by welding with the bolt.

19. The vaulted cover assembly of claim 18 wherein the nut of each of the holding bolts is joined fixedly with the respective cover plate.

20. The vaulted cover assembly of claim 18 wherein the nut of each of the corner bolts is joined fixedly with one of the two sliding disks for the support of the cover plates.

21. The vaulted cover assembly of claim 19 or 20 wherein the sliding disks for the support of the cover plates together with the surfaces of the cover plates between the sliding disks are coated against frictional welding.

* * * * *